Dec. 15, 1936.  P. J. CONBOY  2,064,152
DIFFERENTIAL GEARING
Filed Oct. 17, 1935  2 Sheets-Sheet 1

Inventor
Philip J. Conboy
By Cyrus Kehr
his Attorney

Dec. 15, 1936.          P. J. CONBOY          2,064,152
                    DIFFERENTIAL GEARING
              Filed Oct. 17, 1935         2 Sheets-Sheet 2
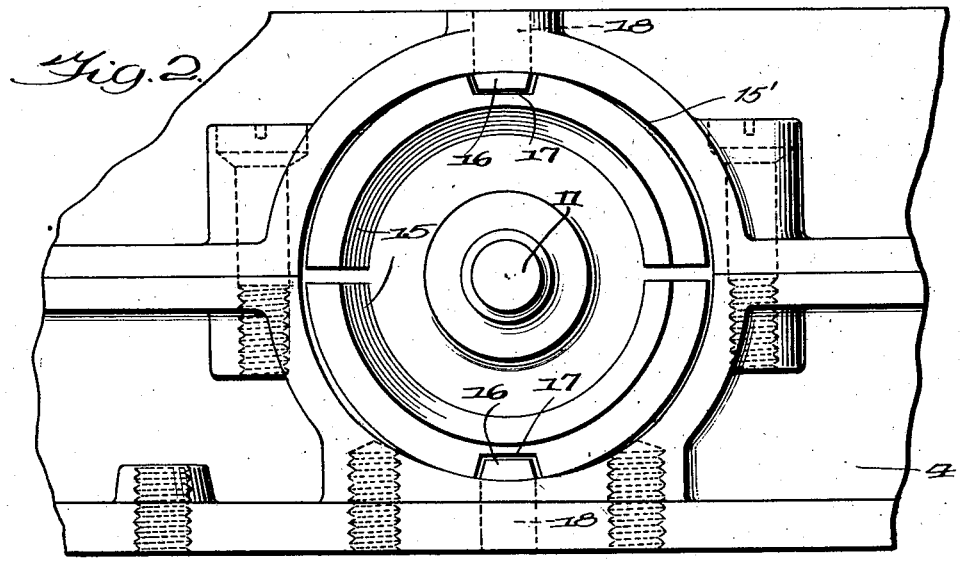
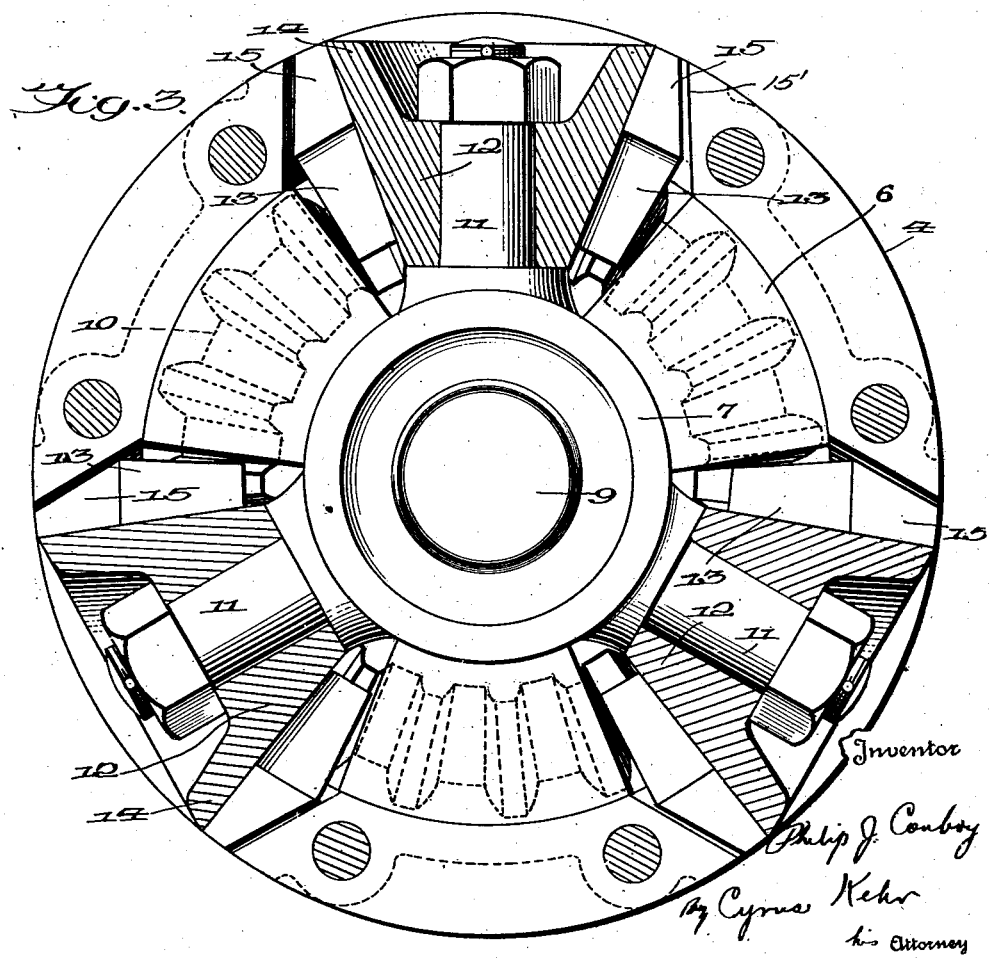

Patented Dec. 15, 1936

2,064,152

UNITED STATES PATENT OFFICE 2,064,152

DIFFERENTIAL GEARING

Philip J. Conboy, Philadelphia, Pa.

Application October 17, 1935, Serial No. 45,473

8 Claims. (Cl. 74—315)

This invention relates to an improvement in differential gearing, such for instance, as is ordinarily used on the driving axles of a motor vehicle for applying driving motion thereto, from the drive or propeller shaft thereof.

Ordinarily, differential gearing such as has been used heretofore requires traction for both wheels of the vehicle, in order to impart a driving force to the axle and if one wheel is on a slippery surface, such as mud or ice, the entire driving force would be transmitted thereto, without the transmission of any driving force to the other wheel, with the result that traction is not obtained sufficient to move the vehicle.

It is the object of my invention to provide for the independent driving of either or both of the axles automatically in such a way that should either of the wheels fail to have tractional engagement with the surface, driving motion would be imparted to the other wheel so as to move the vehicle and thereby eliminate the spinning of one of the wheels which has resulted heretofore and the corresponding loss of power.

A further object of my invention is to improve the construction of differential gearing so as to provide for automatic driving of either or both of the axles, in order to impart a driving force thereto without the necessity for obtaining traction of both of the wheels.

I have illustrated in the accompanying drawings a preferred embodiment of my invention, in which:

Fig. 2 is a plan view partly in section showing one of the split rings for the pinions in place; and Fig. 3 is a vertical sectional view through the differential gearing.

Figure 1:
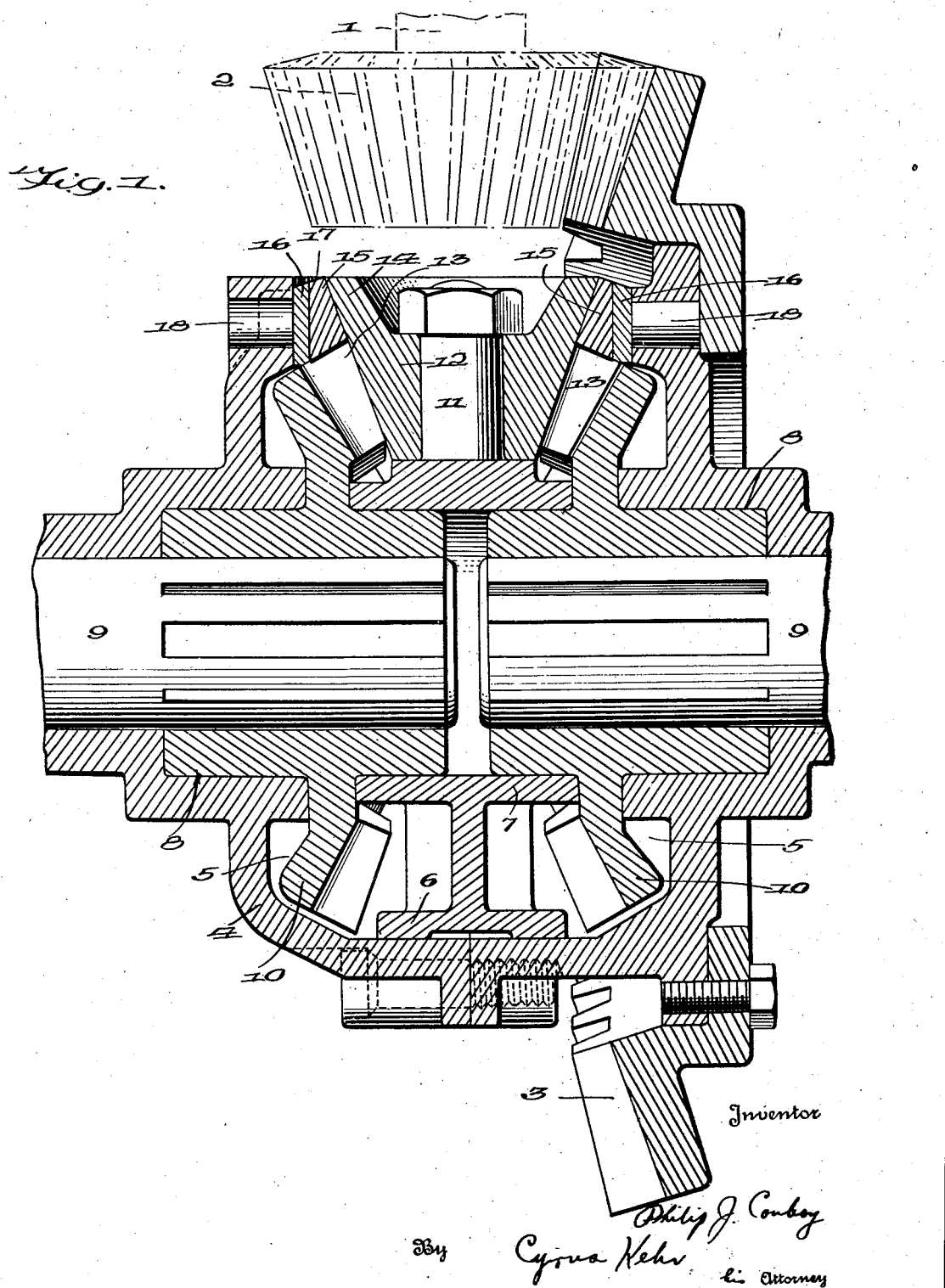
Fig. 1 is a horizontal sectional view of my improved differential gearing.

The main drive shaft of the vehicle is designated by the numeral 1, and is mounted in suitable bearings in a differential housing (not shown). The end of the drive shaft 1 has a pinion 2 fixed thereon, meshing with a beveled gear 3, for transmitting power to both of the axles. The beveled gear 3 is fixed to a sectional casing or housing 4, the parts of which are secured together and contain a chamber 5 therein, divided by a spider 6 which is substantially I-shape in cross-section, as shown in Fig. 1. The spider 6 is journaled in the casing 4, and it has a wide annular flange 7, at its inner side which forms a bearing. Bearings are also formed at 8, in the casing 4.

The axles 9 are mounted in the usual axle housings (not shown). Each of the axles 9 has a beveled gear 10, splined thereto and being disposed in one side of the chamber 5, the gears 10 being on opposite sides of the spider 6.

Pins 11 are integral with and extend radially from the annular flange 7 of the spider 6. Pinions 12 are journaled on the pins 11 and have their teeth 13 meshing with the teeth of the beveled gears 10. It will be noted that the hub 14, of each pinion 12 extends radially a substantial distance beyond the outer ends of the teeth 13 which outer portions of the hubs are smooth at their peripheries. The hub 14 is tapered on the same angle as the bottom cut of the teeth making it easier for the machinist in cutting the pinions. A split ring 15 in two parts, as shown in Fig. 2, surrounds the extended hub 14 of each beveled gear 12, and has its inner surface tapered corresponding with the tapered periphery of the hub 14, so as to fit against the periphery and capable of holding the beveled pinion against rotation relative thereto. The split rings 15 are mounted in elongated openings 15' in the housing or casing 4, which elongated openings allow slight bodily movement of the casing relative to the rings, after which slight movement of the casing is transmitted through the rings to the spider and bevel gears. The split ring 15 is held against turning with the pinion by wedges, spacers, or other suitable means. Merely for purpose of illustration, I have shown wedges 16 engaged in notches 17 of the sections and held by pins 18 in the casing.

When driving force is applied to the drive shaft 1, it will act through the beveled pinion 2, and gear 3 to cause rotation of the casing 4. This causes slight movement of the casing relative to the spider 6, which causes the split rings 15 to grip the peripheries of the hub 14 to turn the spider 6, thereby bodily rotating the beveled pinions 12 about the central axis which in turn causes uniform rotation of both of the axles 9. If one wheel has less traction than the other, heretofore the differential gearing used would have permitted free rotation of the former without rotation of the latter by reason of permitting free rotation of the planetary beveled pinions about their individual axes. In my invention, if one wheel has less traction than the other which would ordinarily permit spinning of the former freely, instead of permitting spinning as heretofore, the split holding rings 15 still grip the peripheries of the extended hubs 14 of the beveled pinions 12, with sufficient friction to hold the pinions positively and overcome the uneven load on the wheels of the vehicle, so as to apply positive driving force to the axles, including that, the wheel of which is not free to rotate by reason of its traction and thus prevent free spinning of one of the wheels, but on the other hand to drive the same positively or to drive either of the wheels positively which has traction. Even if there is no traction for one wheel, it will be rotated with the other wheel, but it will not spin freely, as heretofore.

From uneven diameter of wheels, or in making a turn, the wheel that travels the fastest in making the turn will act to loosen the split rings just enough for differential rotation of the wheels according to the differential in speeds thereof.

In this way, I have effected a substantial improvement in differential gearing that will provide better and more satisfactory driving of the vehicle wheels.

I claim:

1. In a differential, the combination of a driving rotatable support, a spider mounted for movement relative to said rotatable support, bevel gear means for the differential including bevel pinions connected with the spider, and means including automatic clutching means forming a direct driving connection between the rotatable support and the pinions.

2. In a differential, the combination of a driving rotatable support, a spider mounted for movement relative to said rotatable support, and carrying pinions, each pinion having a hub, split rings carried by the rotatable support for frictionally engaging the hubs of the pinions, and driven means operatively connected with the pinions.

3. In a differential, the combination of a driving rotatable support, a spider journaled for movement relative to said rotatable support and carrying pinions, each pinion having a hub, split rings in said support for frictionally engaging the hubs of the pinions, said split rings turning the spider by turning movement of the rotatable support, and driven means operatively connected with the pinions.

4. In a differential, the combination of a driving rotatable housing, a spider journaled in said housing and movable relative thereto, pinions journaled on said spider, each pinion having a hub, split rings frictionally engaging the hubs of the pinions and connected with the housing for turning the spider upon rotation of the housing, and gears meshing with the pinions.

5. In a differential, the combination of a driving rotatable housing, a spider journaled in said housing and movable relative thereto, said spider carrying radial pins, bevel pinions journaled on said pins, each pinion having a smooth peripheral hub surface, split rings mounted in the housing and having slight bodily movement relative thereto, said split rings surrounding and frictionally engaging the hubs of the pinions and turning the spider upon rotation of the housing, and bevel gears on opposite sides of the spider and meshing with the bevel pinions, said split rings being expansible relative to the hubs upon differential movement of the bevel gears.

6. In a differential, the combination of a driving rotatable support, a spider mounted for movement relative to said rotatable support and carrying pinions, each pinion having a hub, and means for automatically forming a frictional driving engagement between the hubs of the pinions and the rotatable support.

7. In a gear differential, the combination of a driving rotatable casing, a spider having its periphery bearing in said casing, said bearing being operative to support the spider therein, bevel gear means for the differential including bevel pinions connected with the spider, and automatic clutching means forming a direct driving connection between the rotatable support and the pinions.

8. In a gear differential, the combination of a driving rotatable casing, a spider having its periphery bearing in said casing, said bearing being operative to support the spider therein, bevel gear means for the differential including bevel pinions journaled on the spider, each of said bevel pinions having a smooth approximately cylindrical neck, and one or more friction members approximately concentric with said neck and movable bodily toward and from the axis of said neck, said friction member or members being arranged for movement by slight movement of the casing relative to the spider.

PHILIP J. CONBOY.